US009532081B2

United States Patent
Morimoto (10) Patent No.: US 9,532,081 B2
(45) Date of Patent: Dec. 27, 2016

(54) IN-VEHICLE INFORMATION DISTRIBUTION SYSTEM AND IMAGE-CONTENTS DISTRIBUTION METHOD OF IN-VEHICLE INFORMATION DISTRIBUTION SYSTEM

(71) Applicant: Kazunari Morimoto, Tokyo (JP)

(72) Inventor: Kazunari Morimoto, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 0 days.

(21) Appl. No.: 14/650,382

(22) PCT Filed: Jan. 18, 2013

(86) PCT No.: PCT/JP2013/050992
§ 371 (c)(1),
(2) Date: Jun. 8, 2015

(87) PCT Pub. No.: WO2014/112111
PCT Pub. Date: Jul. 24, 2014

(65) Prior Publication Data
US 2015/0319465 A1    Nov. 5, 2015

(51) Int. Cl.
*H04N 7/18* (2006.01)
*H04N 21/214* (2011.01)
(Continued)

(52) U.S. Cl.
CPC .......... *H04N 21/2146* (2013.01); *H04H 20/62* (2013.01); *H04N 21/2407* (2013.01); *H04N 21/41422* (2013.01); *H04N 21/482* (2013.01)

(58) Field of Classification Search
USPC .................................... 725/74–84
See application file for complete search history.

(56) References Cited

U.S. PATENT DOCUMENTS 8,595,776 B2    11/2013   Takada et al.
2005/0028208 A1*  2/2005   Ellis ..................... H04N 7/163
                                                                725/58
(Continued)

FOREIGN PATENT DOCUMENTS

EP    1903800 A1    3/2008
EP    2641808 A1    9/2013
(Continued)

OTHER PUBLICATIONS

International Search Report (PCT/ISA/210) mailed on Apr. 2, 2013, by the Japanese Patent Office as the International Searching Authority for International Application No. PCT/JP2013/050992.
(Continued)

Primary Examiner — Nasser Goodarzi
Assistant Examiner — Fred Peng
(74) Attorney, Agent, or Firm — Buchanan Ingersoll & Rooney PC (57) ABSTRACT

A central device includes a first information storage unit in which an image-contents-distribution management table and image contents are stored and a first information control unit that determines an image display device that is to store therein the image contents based on the image-contents-distribution management table, and distributes the image contents to the image display device, and the image display device includes a second information storage unit in which the image-contents-distribution management table and the image contents are stored and a second information control unit that determines a location where the image contents are stored among the image display device and the central device based on the image-contents-distribution management table and displays the image contents read from a determined location.

4 Claims, 6 Drawing Sheets

(51) Int. Cl.
*H04N 21/414* (2011.01)
*H04N 21/482* (2011.01)
*H04N 21/24* (2011.01)
*H04H 20/62* (2008.01)

(56) References Cited

U.S. PATENT DOCUMENTS

| | | | | |
|---|---|---|---|---|
| 2005/0251846 | A1* | 11/2005 | Dravida | H04L 12/2801 725/129 |
| 2005/0289611 | A1* | 12/2005 | Taki | H04N 7/18 725/75 |
| 2006/0282563 | A1 | 12/2006 | Son | |
| 2008/0237406 | A1* | 10/2008 | Saito | B61D 49/00 246/124 |
| 2008/0295138 | A1* | 11/2008 | Emoto | B61D 49/00 725/81 |
| 2009/0007192 | A1* | 1/2009 | Singh | H04L 67/06 725/75 |
| 2011/0035776 | A1* | 2/2011 | Nagai | B61D 49/00 725/75 |
| 2011/0314494 | A1* | 12/2011 | Morimoto | B61L 3/12 725/32 |
| 2013/0283655 | A1 | 10/2013 | Saito et al. | |

FOREIGN PATENT DOCUMENTS

| | | |
|---|---|---|
| JP | 2004-203338 A | 7/2004 |
| JP | 2005-242447 A | 9/2005 |
| JP | 2007-193098 A | 8/2007 |
| JP | 2012-81831 A | 4/2012 |
| WO | WO 2005/008471 A1 | 1/2005 |
| WO | WO 2011/004666 A1 | 1/2011 |
| WO | 2011150026 A1 | 12/2011 |
| WO | WO 2012/066641 A1 | 5/2012 |

OTHER PUBLICATIONS

Written Opinion (PCT/ISA/237) mailed on Apr. 2, 2013, by the Japanese Patent Office as the International Searching Authority for International Application No. PCT/JP2013/050992.
Extended Search Report issued by the European Patent Office on Sep. 16, 2016 in corresponding EP Application No. 13872223.6 (9 pages).

* cited by examiner

| No. | IMAGE CONTENTS ID | IMAGE STORAGE LOCATION |
|---|---|---|
| 1 | 001 | IMAGE DISPLAY DEVICE 30-11 |
| 2 | 003 | CENTRAL DEVICE |
| 3 | 008 | IMAGE DISPLAY DEVICE 30-21 |
| 4 | 010 | IMAGE DISPLAY DEVICE 30-21 |
| 5 | 030 | IMAGE DISPLAY DEVICE 30-11 |
| 6 | 077 | IMAGE DISPLAY DEVICE 30-11 |
| ⋮ | ⋮ | ⋮ |

IN-VEHICLE INFORMATION DISTRIBUTION SYSTEM AND IMAGE-CONTENTS DISTRIBUTION METHOD OF IN-VEHICLE INFORMATION DISTRIBUTION SYSTEM

FIELD

The present invention relates to an in-vehicle information distribution system and an image-contents distribution method of an in-vehicle information distribution system.

BACKGROUND

In recent years, as diversification of people's life patterns progresses, advertisements have considerable influences on people. In this connection, as railroads are used by many people on a daily basis, advertisements such as displaying in train vehicles have significant effects, and thus the demand for advertisements in train vehicles is rapidly increasing. With a view to such demand, in recent years, there has been provided a service in which a display medium such as an LCD display is installed on a panel portion above doors in a train vehicle and train operation information such as the destination, stopping stations, travelling position, and delay information, as well as image contents of video images or still images (such as advertisements and news) are distributed by the display medium. In the following descriptions, the system of distributing image contents in a vehicle is referred to as "in-vehicle information distribution system".

In the in-vehicle information distribution system, image contents are generally distributed by the following three methods. In a first method, a central device installed near a train driver's seat is connected to a terminal (a modem) installed in each vehicle through an analog line, image data of image contents is transmitted via the central device and the modem to an image display device in each vehicle, and images such as advertisements and news are displayed on the image display device. The first method has a problem that the image quality is degraded.

In a second method, a central device is digitally connected to an image display device through Ethernet® and the like, image data is distributed by broadcast and decoded in each image display device, and then images are displayed on each image display device. While this method can provide clear images, similarly to the first method, the second method assumes that the same image contents are displayed on all the image display devices. While it is technically possible to distribute different image data to respective image display devices, it is not realistic because the band of an in-vehicle communication path is limited in a particular environment such as a train vehicle.

In a third method, similarly to the second method, a central device is digitally connected to an image display device, image contents are transmitted in advance from the central device to each image display image, and the image contents are accumulated in each image display device and displayed. According to this method, it is possible to transmit different image contents to respective image display devices, and thus problems of the two methods explained above can be solved. Hereinafter, this method is referred to as "image-display-device accumulation type".

In a conventional technique described in Patent Literature 1 as an example of the device of the image-display-device accumulation type, contents data is stored in a contents display device (corresponding to "image display device"), streaming data is stored in a management server (corresponding to "central device") that manages an image, and these pieces of data are displayed according to switching control.

CITATION LIST

Patent Literature

Patent Literature 1: International Publication No. WO2005/008471

SUMMARY

Technical Problem

However, the device of the image-display-device accumulation type represented by Patent Literature 1 mentioned above has the following problems.

In a railroad train vehicle, for the purposes of reducing the number of cable wires and coupling functions together, on-vehicle communication paths are integrated and thus various pieces of data come and go in the same path. Therefore, it is required to use the band of a communication path as efficient as possible. In the conventional technique of Patent Literature 1 described above, the distribution source of streaming data is only a central device, so that the load of a communication path between the central device and an image display device is increased, and thus the number of distributable streaming (the number of displayable channels) is limited.

Furthermore, among advertisement image data, there are pieces of data of hundreds of megabytes, so that it is preferable to have a storage medium of the central device that can store therein a large capacity of image data for a long time. However, because of the environment unique to trains, a storage medium whose price per unit capacity is very expensive, such as a solid-state drive (SSD), which is heat-resistant and vibration-resistant, is required for a storage medium, and this requirement considerably restricts recording of image data. As a result, the number of image contents that can be stored in the central device is limited.

Further, to receive image data transmitted from a ground communication device in an on-vehicle communication device, centralized management of image contents in the central device is essential, and it is necessary to transmit data while considering the load of the central device. Meanwhile, to reduce the risk in case of the central device is broken, it is necessary to use an embedded device (for example, a low-clock CPU) that is resistant to vibration and noise in a vehicle and is capable of operating stably in a wide range of temperature conditions. However, if such an embedded device is used for the central device, it is difficult to distribute many channels, and packet loss is often caused by noise and vibration in a vehicle, so that there is a problem that the throughput of the central device is not increased.

The present invention has been achieved in view of the above problems, and an object of the present invention is to provide an in-vehicle information distribution system and an image-contents distribution method of an in-vehicle information distribution system that can efficiently display image contents without causing cost increase and reliability degradation.

Solution to Problem

To solve the above problems and achieve the object, an in-vehicle information distribution system according to the present invention includes: a plurality of image display devices that display a plurality of image contents transmitted from a ground communication device to a train; a communication device that is connected to an inter-vehicle communication path and an in-vehicle communication path and that relays information; and a central device that is connected to the communication device and an on-vehicle communication device within a same vehicle by the in-vehicle communication path and that manages information transferred to a train. The central device includes: a first information storage unit where an image-contents-distribution management table in which identification information for uniquely identifying the respective image contents and the respective image contents are stored in a corresponding manner and the respective image contents are stored; and a first information control unit that determines one image display device that is to store therein image contents based on the image-contents-distribution management table, and distributes image contents stored in the first information storage unit to the one determined image display device. Each of the image display devices includes: a second information storage unit in which the image-contents-distribution management table and image contents distributed from the first information control unit are stored; and a second information control unit that determines a location where image contents are stored based on the image-contents-distribution management table and displays image contents read out from a determined location.

Advantageous Effects of Invention

According to the present invention, it is configured that respective image display devices transmit image contents to each other by using an image-contents-distribution management table, so that it is possible to efficiently display image contents without causing cost increase and reliability degradation.

DESCRIPTION OF EMBODIMENTS

Exemplary embodiments of an in-vehicle information distribution system according to the present invention will be explained below in detail with reference to the accompanying drawings. The present invention is not limited to the embodiments.

First Embodiment

Figure 1:
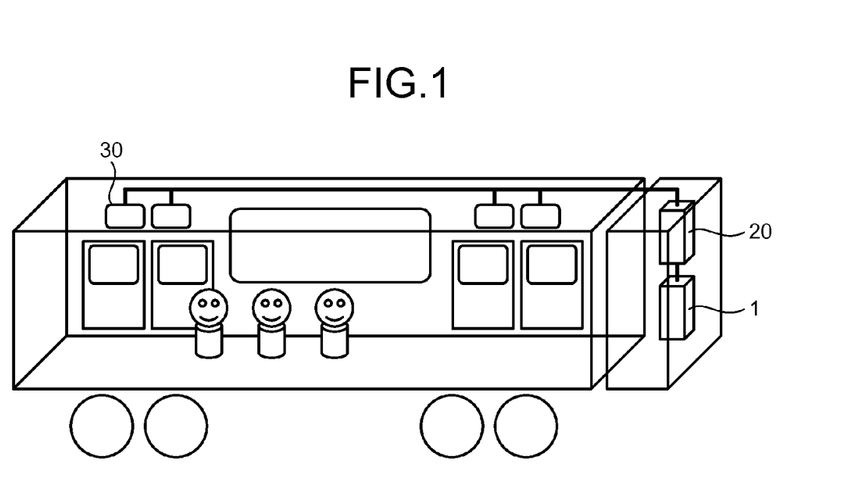
FIG. 1 shows an on-vehicle communication device, a central device, and an image display device that constitute an in-vehicle information distribution system according to a first embodiment of the present invention.
Figure 2:
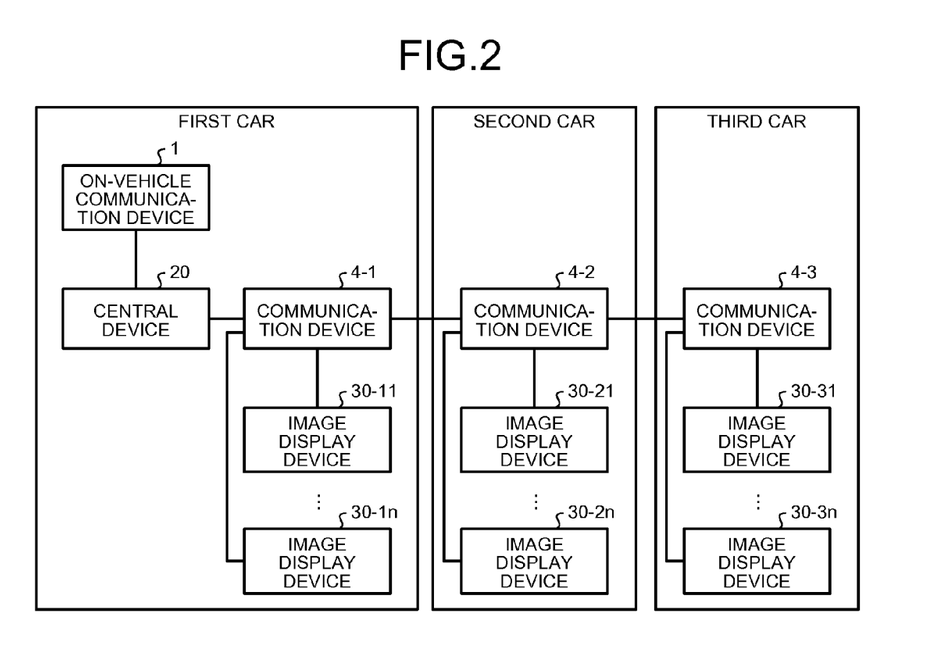
FIG. 2 shows a configuration example of devices incorporated in each vehicle.
Figure 3:
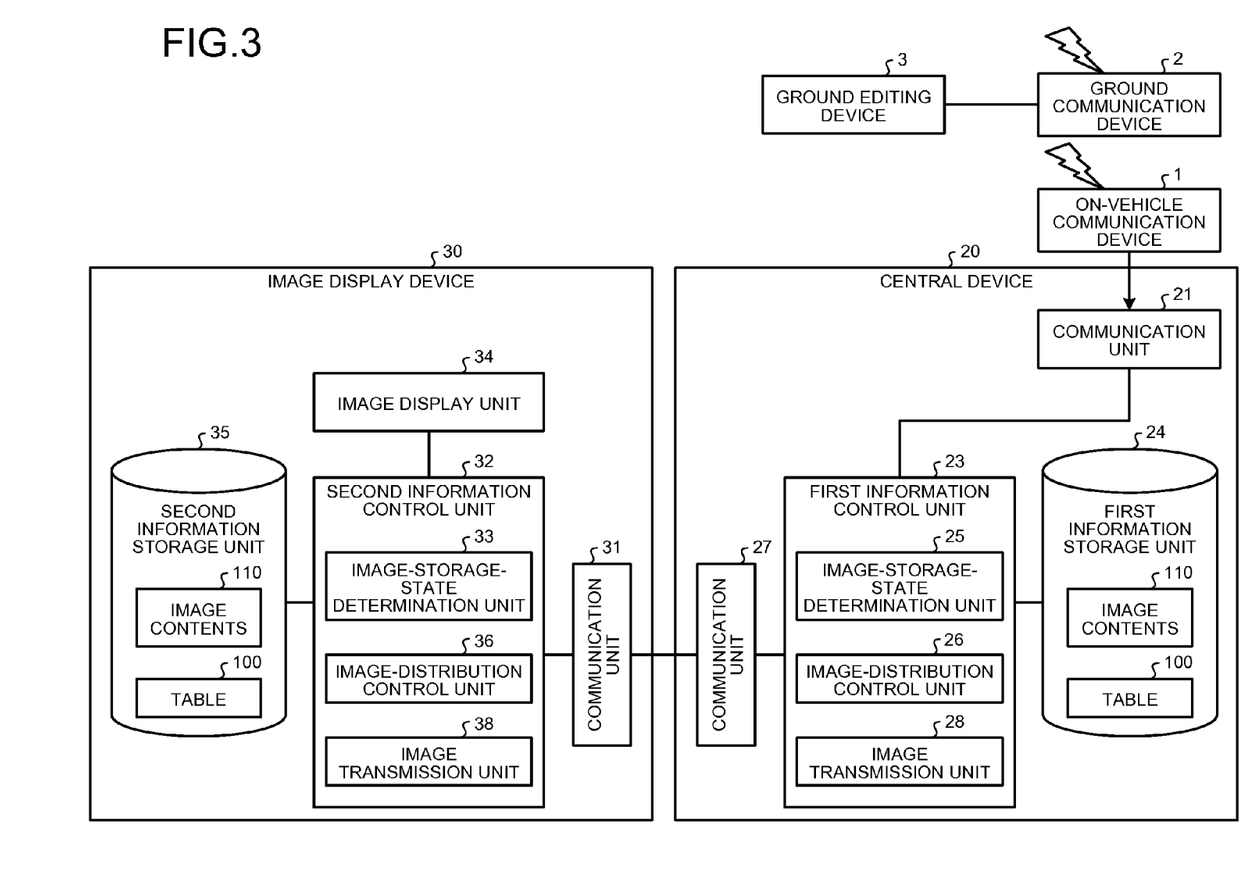
FIG. 3 shows details of constituent devices in the in-vehicle information distribution system according to the first embodiment of the present invention.
Figure 4:
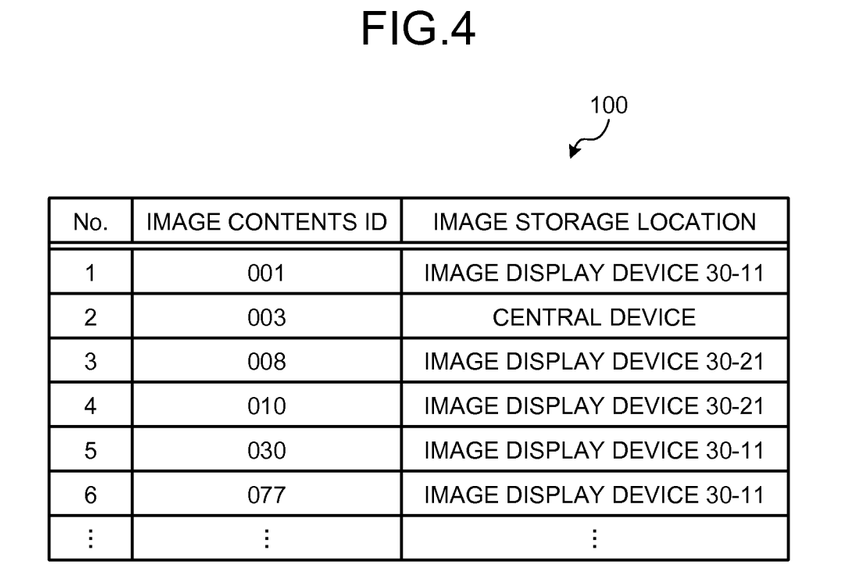
FIG. 4 shows an image-contents-distribution management table.

FIG. 1 shows an on-vehicle communication device, a central device, and an image display device that constitute an in-vehicle information distribution system according to a first embodiment of the present invention. FIG. 2 shows a configuration example of devices incorporated in each vehicle. FIG. 3 shows details of constituent devices in the in-vehicle information distribution system according to the first embodiment of the present invention. FIG. 4 shows an image-contents-distribution management table (hereinafter, "management table 100").

The in-vehicle information distribution system according to the present embodiment is targeted for a train constituted by a plurality of vehicles (in FIG. 2, from a first car to a third car). On the train side, an on-vehicle communication device 1, a central device 20, communication devices 4 (4-1 to 4-3), and image display devices 30 (30-11 to 30-3n), which are devices constituting the in-vehicle information distribution system, are installed. On the ground side, a ground communication device 2 and a ground editing device 3, which are devices constituting the in-vehicle information distribution system, are installed.

In FIG. 2, the on-vehicle communication device 1, the central device 20, the communication device 4-1, and the plurality of image display devices 30-11 to 30-1n are installed in the first car. The communication device 4-2 and the plurality of image display devices 30-21 to 30-2n are installed in the second car. The communication device 4-3 and the plurality of image display devices 30-31 to 30-3n are installed in the third car.

The on-vehicle communication device 1 and the communication device 4-1 are connected to the central device 20. The central device 20 is also connected to various control operation devices such as a main controller (not shown), and various data input/output processes are performed in the central device 20.

One or more communication devices 4 are installed in each vehicle, connected to each other via an inter-vehicle communication path (not shown), and have a function of transmitting and receiving data being transferred between vehicles. The communication devices 4 include a plurality of connection ports (not shown) so that the image display devices 30 can be connected thereto. In addition, the communication devices 4 have a function of relaying the management table 100 and image contents 110 (for example, advertisements and news) distributed from the central device 20 to the image display devices 30.

The image display devices 30 have a function of storing therein the management table 100 and the image contents 110 distributed via the communication devices 4; and have a function of reading the image contents 110 stored in a local storage and displaying the image contents 110 on an image display unit 34, or a function of downloading the image contents 110 stored in a remote storage and displaying the image contents 110 on the image display unit 34. Details of these functions are explained later.

The ground editing device 3 shown in FIG. 3 is installed in a building of an advertisement production company, for example. In the ground editing device 3, the management table 100 and the image contents 110 are edited. The ground communication device 2 is installed, for example, in a station platform or the like and is connected to the ground editing device 3. The on-vehicle communication device 1 has a function of performing communication with the ground communication device 2 by a wireless system such as WiFi.

The central device 20 is constituted by including a communication unit 21, a first information control unit 23, a first information storage unit 24, and a communication unit 27. The communication unit 21 is an interface for connecting the central device 20 to the on-vehicle communication device 1, and the communication unit 27 is an interface for connecting the central device 20 to the communication devices 4 (see FIG. 2).

The first information control unit 23 stores data of the management table 100 and data of the image contents 110 that are transmitted from the ground communication device 2 via the communication unit 21 in the first information storage unit 24. In an image-distribution control unit 26 of the first information control unit 23, the management table 100 is transmitted to the image display devices 30, and the image contents 110 in the first information storage unit 24 are distributed to image storage locations described in the management table 100.

The image display device 30 is constituted by including a communication unit 31, a second information control unit 32, the image display unit 34, and a second information storage unit 35. The communication unit 31 is an interface for connecting the communication devices 4 (see FIG. 2) to the central device 20.

The second information control unit 32 stores the management table 100 and the image contents 110 transmitted from the first information control unit 23 in the second information storage unit 35. In an image-storage-state determination unit 33 of the second information control unit 32, the storage location of the image contents 100 is determined based on the management table 100.

For example, when an image storage location described in the management table 100 is same as a device storing therein the management table 100, that is, when the image storage location is a data accumulation unit (a local storage) of the device itself, the second information control unit 32 reads out the image contents 110 stored in the local storage and displays the image contents 110 on the image display unit 34.

Meanwhile, when the image storage location described in the management table 100 is a device other than the device storing therein the management table 100, that is, when the image storage location is a data accumulation unit (a remote storage) of a device other than the device itself, the second information control unit 32 requests an information control unit of the corresponding device (for example, the first information control unit 23 of the central device 20) to transmit the image contents 110, and displays the image contents 110 transmitted in response to the transmission request on the image display unit 34.

FIG. 4 shows an example of the management table 100. In the management table 100, identification information for uniquely identifying the plurality of image contents 110 (for example, file names or image contents IDs shown in FIG. 4) and an image storage location are stored so as to correspond to serial numbers 1, 2, ..., n (n is an integer other than 0). For example, the storage locations of image contents with the IDs "001", "030", and "077" are the image display device 30-11. Similarly, the storage location of image contents with the ID "003" is the central device 20, and the storage locations of image contents with the IDs "008" and "010" are the image display device 30-21.

For example, the image-storage-state determination unit 33 of the image display device 30-11 refers to the management table 100, and determines that the image contents with the ID "001" are stored in the second information storage unit 35 (a local storage) of the image display device 30-11. When a determination is made in this manner, the second information control unit 32 of the image display device 30-11 reads out the image contents with the ID "001" from the local storage.

The image-storage-state determination unit 33 of the image display device 30-11 refers to the management table 100, and determines that the image contents with the ID "008" are stored in the second information storage unit 35 (a remote storage) of the image display device 30-21. When a determination is made in this manner, the second information control unit 32 of the image display device 30-11 requests the image display device 30-21 to transmit the image contents with the ID "008".

Examples of the type of the image contents 110 include information with a relatively fast update frequency such as news and weather forecasts and information with a relatively slow update frequency such as commercial messages (CM). With respect to the location in which the image contents 110 are stored, for example, information with a relatively fast update frequency is stored in the central device 20, and information with a slow update frequency is stored in a location other than the central device 20 (such as the image display device 30-11).

The location in which the image contents 110 are stored is not limited to the locations mentioned above. For example, it is also possible to configure that information with a slow update frequency is stored in each image display device 30, a part of information with a fast update frequency is stored in the central device 20, and the remaining part of the information with a fast update frequency may be stored in the image display devices 30 in a distributed manner.

As explained above, in the in-vehicle information distribution system according to the present embodiment, it is configured that the plurality of image contents 110 and the management table 100 are stored in a plurality of devices in the system in a distributed manner, and the respective image display devices 30 read out the image contents 110 based on the management table 100 so as to display the image contents 110. Accordingly, as compared to a case where all the image contents 110 are stored in the central device 20 and the image contents 110 stored in the central device 20 are downloaded to the respective image display devices 30 and then displayed, the load of a communication path between the central device 20 and the respective image display devices 30 can be reduced and the number of displayable channels can be increased.

According to the in-vehicle information distribution system of the present embodiment, the storage capacity of the overall system can be effectively used, and the number of distributable channels can be increased without increasing the storage capacity of the central device 20.

According to the in-vehicle information distribution system of the present embodiment, the load of the central device 20 accompanied by the transmission of the image contents 110 can be reduced. Therefore, even when a low-clock CPU is used for the central device 20, a lot of image contents 110 can be distributed. Further, packet loss caused by noise and vibration in a vehicle can be reduced, and the throughput of the central device 20 can be improved.

Operations of the in-vehicle information distribution system will be explained below. First, an operation of the in-vehicle information distribution system when the management table 100 and the image contents 110 are not stored in the image display device 30 will be explained.

The management table 100 and the image contents 110 edited by the ground editing device 3 are received by the first information control unit 23 via the ground communication device 2, the on-vehicle communication device 1, and the communication unit 21, and are stored in the first information storage unit 24. The management table 100 is also transmitted to the image display device 30 incorporated in each vehicle, and is stored in the second information storage unit 35 of the image display device 30.

In an image-storage-state determination unit 25 of the first information control unit 23, an image storage location is confirmed in the order of the serial numbers in the management table 100. In the example of FIG. 4, it is determined that the image contents with ID "008" are stored in the image display device 30-21.

The image-distribution control unit 26 reads out, from the first information storage unit 24, the image contents 110 whose storage location has been specified by the image-storage-state determination unit 25, attaches a header indicating a transmission destination and the like to image data of the read image contents 110, and distributes the image data. In the second information control unit 32 of the image display device 30 having received this packet, the image data is extracted and stored in the second information storage unit 35 as the image contents 110. With similar procedures, the image contents 110 having been specified by the image-storage-state determination unit 25 and to be stored in the image display device 30 are stored in each image display device 30.

Figure 5:
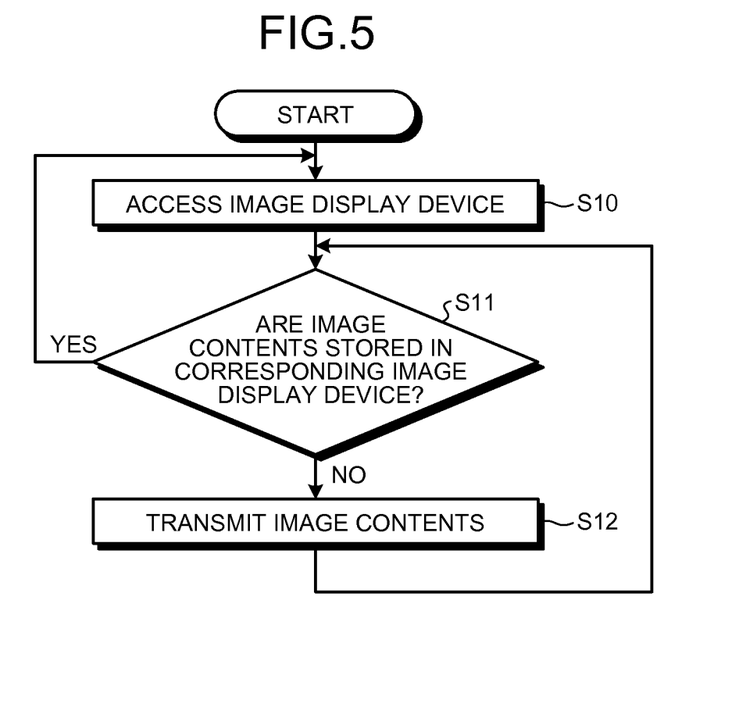
FIG. 5 is a flowchart of an operation of the central device.

The operation explained above may be configured as follows. FIG. 5 is a flowchart of an operation of the central device 20. The image-storage-state determination unit 25 of the first information control unit 23 accesses each image display device 30 (Step S10), refers to the image contents 110 and the management table 100 stored in the second information storage unit 35 of the image display device 30, and determines whether the image contents are stored in the image display device 30, although the image storage location described in the management table 100 is the image display device 30.

When the image contents described in the management table 100 are not stored in the image display device 30 (NO at Step S11), an image transmission unit 28 of the first information control unit 23 transmits image contents that are not stored in the image display device 30 among the image contents stored in the first information storage unit 24 to the image display device 30 (Step S12). Thereafter, the processes at Step S11 and Step S12 are repeated until transmission of all the image contents to be stored in the image display device 30 is completed.

When the image contents described in the management table 100 are stored in the image display device 30 (YES at Step S11), the image-storage-state determination unit 25 performs the process at Step S10 again.

Next, an operation after the management table 100 is stored in the image display device 30 will be explained.

Figure 6:
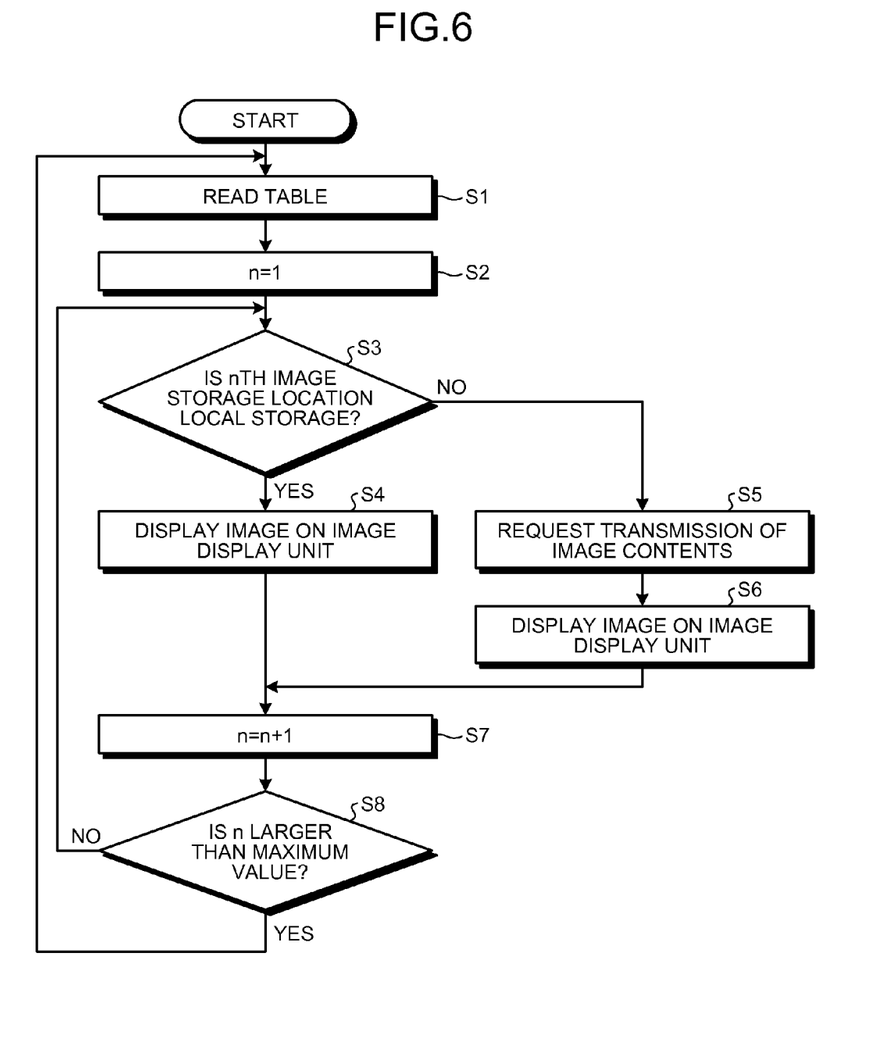
FIG. 6 is a flowchart showing an operation in which an information control unit of the image display device specifies a storage location of image contents and displays an image.

FIG. 6 is a flowchart showing an operation in which an information control unit of the image display device specifies a storage location of image contents and displays an image. The second information control unit 32 reads out the management table 100 stored in advance (Step S1). When the storage location of image contents with the serial number "1" is a local storage (Step S2 and YES at Step S3), the second information control unit 32 displays image contents stored in the local storage on the image display unit 34 (Step S4).

When the storage location of the image contents with the serial number "1" is not a local storage (Step S2 and NO at Step S3), the second information control unit 32 requests an information control unit of a device in which the image contents are stored to transmit the image contents (Step S5). When a receiving destination of the transmission request is the central device 20, the image transmission unit 28 of the central device 20 reads out image contents corresponding to the transmission request from the first information storage unit 24 and transmits the image contents to the image display device 30 that is the request source. Thereafter, the second information control unit 32 of the image display device 30 having received the image contents displays the image contents on the image display unit 34 (Step S6).

While the image contents with the serial number "1" are displayed, the image-storage-state determination unit 33 increments n by 1 (Step S7). When the value of n does not exceed the maximum value of the serial number of the management table 100 (NO at Step S8), in the second information control unit 32, the processes at Step S3 to Step S7 are repeated until the value of n exceeds the maximum value of the serial number.

When the value of n exceeds the maximum value of the serial number of the management table 100 (YES at Step S8), in the second information control unit 32, the processes at Step S1 to Step S7 are performed again.

To additionally explain the timing of displaying an image on the image display unit 34, before display of the image contents 110 transmitted from the second information control unit 32 is completed, the image display unit 34 requests the second information control unit 32 to transmit the next image contents 110. With this operation, it is possible to prevent a time lag, between when display of one set of image contents 110 is completed and when display of another set of image contents 110 starts, from occurring.

The operation of an image transmission unit 38 of the image display device 30 is identical to that of the image transmission unit 28 of the central device 20. For example, when the image-storage-state determination unit 33 of the image display device 30-11 determines that the image storage location of the serial number "3" is the image display device 30-21, a transmission request from the image display device 30-11 is transmitted to the image transmission unit 38 of the image display device 30-21. The image transmission unit 38 of the image display device 30-21 reads out image contents corresponding to the transmission request from the second information storage unit 35 and transmits the image contents to the image display device 30-11 that is a request source. Thereafter, the second information control unit 32 of the image display device 30-11 having received the image contents displays the image contents on the image display unit 34.

Generally, the image display method in the image display unit 34 is changed depending on the acquisition source of image data, for example, depending on whether image data is read in from a local storage and displayed, or image data distributed from a remote storage is displayed, so that the S/W configuration of the image display unit 34 has been complicated. According to the in-vehicle information distribution system of the present embodiment, even when image data is read in from a local storage, an image-distribution control unit 36 that is identical to the image-distribution control unit 26 provided in the central device 20 is provided in the image display device 30, and the image display unit 34 can receive the image data from the image-distribution control unit 36. Therefore, it is not necessary to be conscious about whether the read source of the image data is a local storage or a remote storage, and thus the S/W configuration of the image display unit 34 can be simplified.

As another effect, when it is configured that image contents having transmitted from the central device 20 to each image display device 30 (for example, the image contents with the ID "001" shown in FIG. 4) are deleted from the first information storage unit 24 of the central device 20, the spare capacity of the first information storage unit 24 is increased, and thus the first information storage unit 24 can be used effectively.

It is also possible to configure that, in a group of image display devices incorporated in each vehicle, for example, the image display device 30-11 of the first car, the image display device 30-21 of the second car, and the like are designated as representative image display devices, the management table 100 is stored only in the representative image display devices, and image data is transmitted based on the management table 100 only between the central device 20 and the representative image display devices. With this configuration, the processing load of the central device 20 is reduced as compared to a case of transmitting image data between the central device 20 and a group of all the image display devices incorporated in each vehicle, and images displayed by a plurality of image display devices in the respective vehicles can be synchronized.

As explained above, according to the in-vehicle information distribution system of the first embodiment, the central device 20 includes: the first information storage unit 24 where the management table 100 in which identification information for uniquely identifying the respective image contents 110 and the respective image contents 110 are stored in a corresponding manner and the respective image contents 110 are stored; and the first information control unit 23 that determines the image display device 30 that is to store therein the image contents 110 based on the management table 100, and distributes the image contents 110 stored in the first information control unit 23 to the determined image display device 30. Each image display device 30 includes: the second information storage unit 35 in which the management table 100 and the image contents 110 distributed from the first information control unit 23 are stored; and the second information control unit 32 that determines a location where the image contents 110 are stored based on the management table 100 and displays the image contents 110 read out from the determined location. With the above described configuration, problems of the system of the "image-display-device accumulation type" explained above can be solved, and it is possible to efficiently display image contents without causing cost increase and reliability degradation.

Second Embodiment

Figure 7:
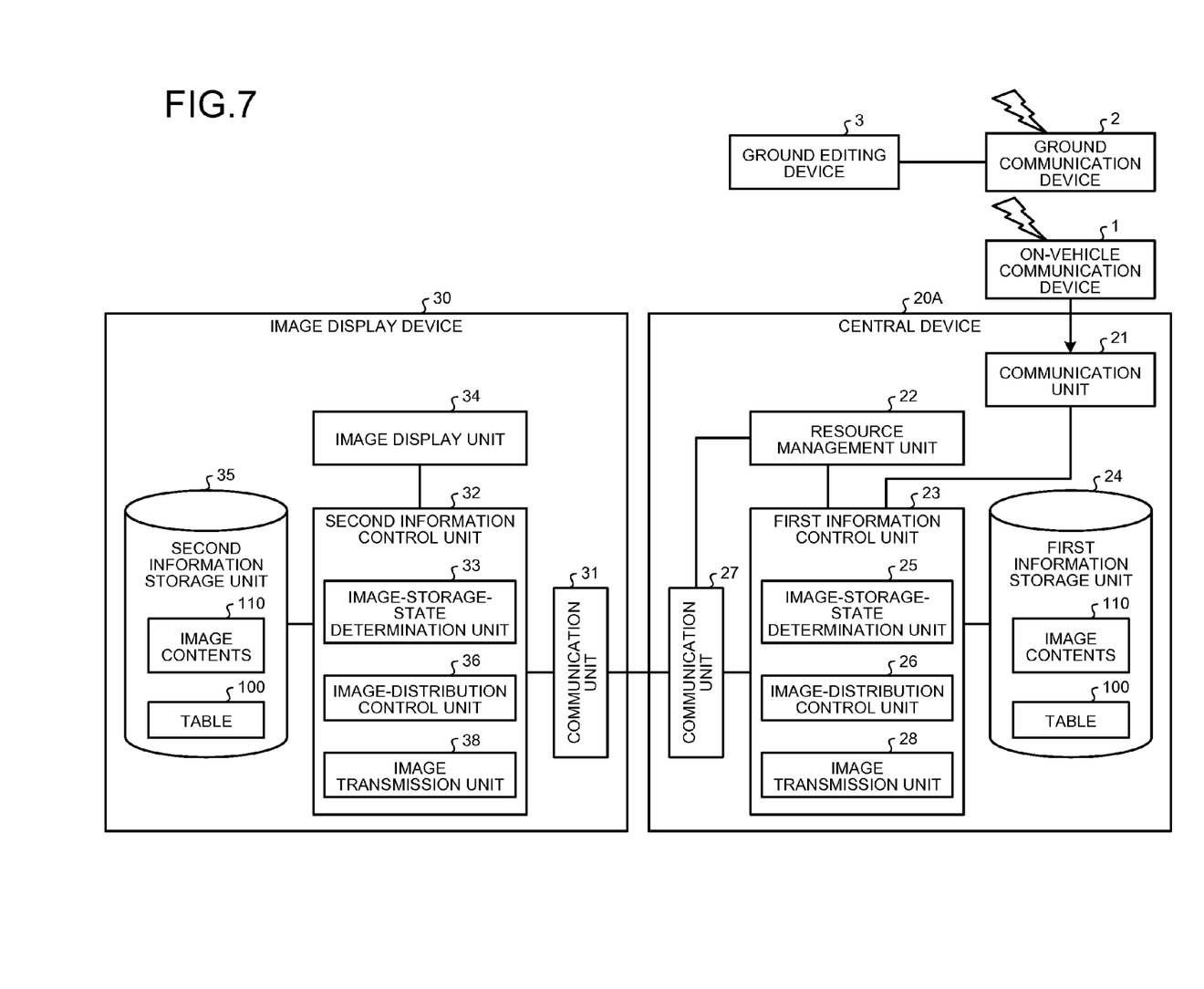
FIG. 7 is a configuration diagram of an in-vehicle information distribution system according to a second embodiment of the present invention.

FIG. 7 is a configuration diagram of an in-vehicle information distribution system according to a second embodiment of the present invention. The second embodiment is different from the first embodiment in that a central device 20A is used instead of the central device 20 and a resource management unit 22 is provided in the central device 20A. In the following descriptions, parts identical to those of the first embodiment are denoted by like reference signs and explanations thereof will be omitted, and only parts different from those of the first embodiment are described below.

The resource management unit 22 is connected to the first information control unit 23 and the communication unit 27. In the resource management unit 22, for example, the usage rate of the first information control unit 23 (for example, a CPU usage rate) and the usage rate of an inter-vehicle communication path connected to the communication unit 27 (for example, a network usage rate) are managed. A calculation of the usage rate of an inter-vehicle communication path indicates the rate of communication between a central device and an image display device, not the usage rate with respect to communication paths of the overall system in a train.

When these usage rates exceed a predetermined determination value, a command to regulate transmission of the image contents 110 to the image display device 30 is output from the resource management unit 22 to the first information control unit 23. In the image transmission unit 28 of the first information control unit 23 having received this command, transmission of the image contents 110 to the image display device 30 is stopped or the image contents 110 are transmitted at a transmission speed lower than a normal transmission speed.

On the other hand, when these usage rates do not exceed a predetermined determination value, a command to regulate transmission of the image contents 110 is not output, and the image contents 110 are transmitted from the image transmission unit 28.

With this configuration, packet loss between the central device 20 and the image display device 30 can be reduced and the throughput of the central device 20A can be prevented from being decreased.

It is also possible to configure that the resource management unit 22 manages only one of the CPU usage rate and the network usage rate. Even with this configuration, effects identical to those described above can be obtained.

Third Embodiment

Figure 8:
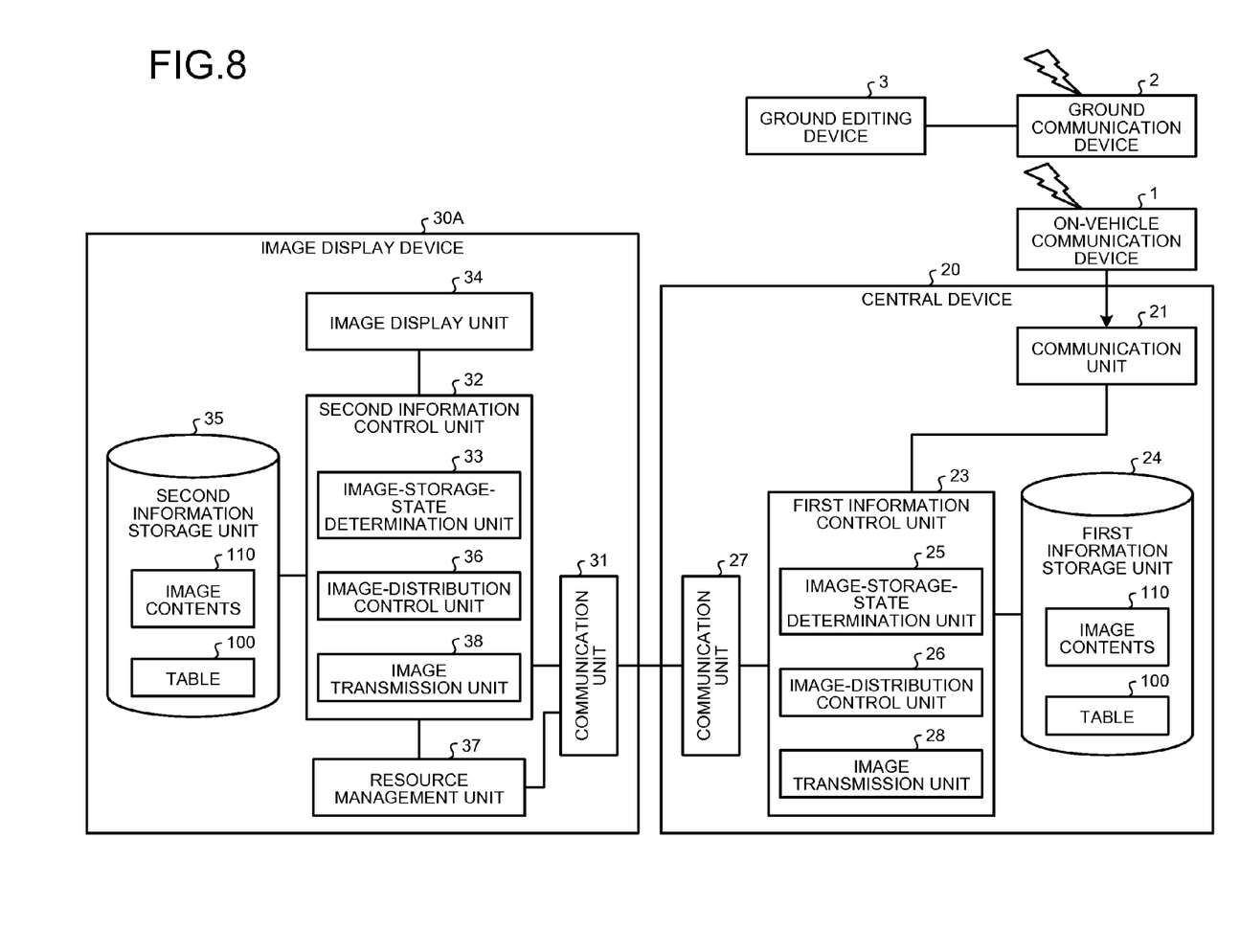
FIG. 8 is a configuration diagram of an in-vehicle information distribution system according to a third embodiment of the present invention.

FIG. 8 is a configuration diagram of an in-vehicle information distribution system according to a third embodiment of the present invention. The third embodiment is different from the first embodiment in that an image display device 30A is used instead of the image display device 30 and a resource management unit 37 is provided in the image display device 30A. In the following descriptions, parts identical to those of the first embodiment are denoted by like reference signs and explanations thereof will be omitted, and only parts different from those of the first embodiment are described below.

The resource management unit 37 is connected to the second information control unit 32 and the communication unit 31. In the resource management unit 37, for example, the CPU usage rate of the second information control unit 32 and the network usage rate of an inter-vehicle communication path connected to the communication unit 31 are managed.

When these usage rates exceed a predetermined determination value, a command to regulate transmission of the image contents 110 to other devices or transmission of the image contents 110 to the image display unit 34 is output from the resource management unit 37 to the second information control unit 32. In the image transmission unit 38 of the second information control unit 32 having received this command, transmission of the image contents 110 to other image display devices 30 is stopped or the image contents 110 are transmitted at a transmission speed lower than a normal transmission speed. Similarly, transmission of the image contents 110 to the image display unit 34 is stopped or the image contents 110 are transmitted at a transmission speed lower than a normal transmission speed.

On the other hand, when these usage rates do not exceed a predetermined determination value, the command explained above is not output, and transmission of the image contents 110 and the like are performed are in the image transmission unit 38.

With this configuration, the performance of the image display device 30A can be prevented from being degraded.

It is also possible to configure that the resource management unit 37 manages only one of the CPU usage rate and the network usage rate. Even with this configuration, effects identical to those described above can be obtained.

In the in-vehicle information distribution system according to the first to third embodiments, the resource management units 22 and 37 may be provided in the central device 20 and the image display device 30. Even with this configuration, effects identical to those described above can be obtained.

The in-vehicle information distribution system according to the embodiments of the present invention is only an example of the contents of the present invention. The present invention can be combined with other well-known techniques, and it is needless to mention that the present invention can be configured while modifying it without departing from the scope of the invention, such as omitting a part of the configuration.

INDUSTRIAL APPLICABILITY

As described above, the present invention is mainly applicable to an in-vehicle information distribution system, and is particularly useful as an invention that can efficiently display image contents without causing cost increase and reduction of reliability.

REFERENCE SIGNS LIST 1 on-vehicle communication device, 2 ground communication device, 3 ground editing device, 4-1, 4-2, 4-3 communication device, 20, 20A central device, 21 communication unit, 22 resource management unit, 23 first information control unit, 24 first information storage unit, 25 image-storage-state determination unit, 26 image-distribution control unit, 27 communication unit, 28 image transmission unit, 30, 30A, 30-11, 30-21, 30-31, 30-1$n$, 30-2$n$, 30-3$n$ image display device, 31 communication unit, 32 second information control unit, 33 image-storage-state determination unit, 34 image display unit, second information storage unit, 36 image-distribution control unit, 37 resource management unit, 38 image transmission unit, 100 image-contents-distribution management table, 110 image contents.

The invention claimed is:

1. An in-vehicle information distribution system comprising:
    a plurality of image display devices that display a plurality of image contents transmitted from a ground communication device to a train;
    a communication device that is connected to an inter-vehicle communication path and an in-vehicle communication path; wherein the communication device relays information; and
    a central device that is connected to the communication device and an on-vehicle communication device within a same vehicle by the in-vehicle communication path and that manages information transferred to the train, wherein
    the central device includes: a first information storage unit where an image-contents-distribution management table in which identification information for uniquely identifying the respective image contents and the respective image contents are stored in a corresponding manner; and
    a first information control unit that determines one image display device that is to store therein image contents based on the image-contents-distribution management table, and distributes image contents stored in the first information storage unit to the one determined image display device, wherein
    each of the image display devices includes:
    a second information storage unit in which the image-contents-distribution management table and image contents distributed from the first information control unit are stored; and
    a second information control unit that determines a location where image contents are stored based on the image-contents-distribution management table and displays image contents read out from a determined location.

2. The in-vehicle information distribution system according to claim 1, wherein the central device includes a resource management unit that, when at least one of a usage rate of the first information control unit and a usage rate of the inter-vehicle communication path exceeds a predetermined value, outputs a command to regulate transmission of image contents to the image display device to the first information control unit.

3. The in-vehicle information distribution system according to claim 1, wherein the image display device includes a resource management unit that, when at least one of a usage rate of the second information control unit and a usage rate of the inter-vehicle communication path exceeds a predetermined value, outputs a command to regulate transmission of image contents to other image display devices or an image display unit to the second information control unit.

4. An image-contents distribution method for operating an in-vehicle information distribution system, the in-vehicle information distribution system including a plurality of image display devices that display a plurality of image contents transmitted from a ground communication device to a train, a communication device that is connected to an inter-vehicle communication path and an in-vehicle communication path and that relays information, and a central device that is connected to the communication device and an on-vehicle communication device within a same vehicle by the in-vehicle communication path and that manages information transmitted to the train, wherein the method comprises:
    transmitting an image-contents-distribution management table in which identification information for uniquely identifying the respective image contents and the respective image contents are stored in a corresponding manner and the respective image contents, from the ground communication device to an on-vehicle communication device,
    storing, in the central device, the image-contents-distribution management table and the respective image contents that are received by the on-vehicle communication device, determining, in the central device, an image display device that is to store therein image contents based on the image-contents-distribution management table, distributing, in the central device, image contents stored in the first image storage unit to a determined image display device, determining, in each image display device, a location where image contents are stored based on the image-contents-distribution management table, and displaying, in each image display device, image contents read from a determined location.

\* \* \* \* \*